(12) United States Patent
Shaw (10) Patent No.: US 8,002,241 B1
(45) Date of Patent: Aug. 23, 2011

(54) HALF BLOCK FOR MULTI-LEVEL INTERLOCKING BLOCKS

(76) Inventor: Anne Shaw, San Gabriel, CA (US)

( * ) Notice: Subject to any disclaimer, the term of this patent is extended or adjusted under 35 U.S.C. 154(b) by 383 days.

(21) Appl. No.: 12/206,141

(22) Filed: Sep. 8, 2008

Related U.S. Application Data

(63) Continuation-in-part of application No. 11/728,925, filed on Mar. 27, 2007, now Pat. No. 7,416,166.

(51) Int. Cl.
B66F 7/24 (2006.01)
(52) U.S. Cl. ........... 254/88; 254/5 C; 254/2 B; 254/134; 248/346; D12/217
(58) Field of Classification Search .................... 254/88, 254/5 C, 134, DIG. 1, 2 B, 90; 248/346; D12/217
See application file for complete search history.

(56) References Cited

U.S. PATENT DOCUMENTS

| 3,162,973 | A | | 12/1964 | Christiansen | |
|---|---|---|---|---|---|
| 3,487,579 | A | | 1/1970 | Brettingen | |
| 4,165,862 | A | * | 8/1979 | Bennett | 254/88 |
| 4,427,179 | A | * | 1/1984 | Price | 251/88 |
| 4,606,732 | A | * | 8/1986 | Lyman | 446/120 |
| 4,838,176 | A | * | 6/1989 | Bowser et al. | 108/53.3 |
| 5,458,315 | A | | 10/1995 | Blatz et al. | |
| D426,933 | S | | 6/2000 | Redfern | |
| 6,135,420 | A | * | 10/2000 | Johnston et al. | 254/88 |
| 6,752,381 | B2 | * | 6/2004 | Colak et al. | 254/88 |
| D520,438 | S | * | 5/2006 | Colak et al. | D12/217 |
| 7,040,603 | B1 | | 5/2006 | Tai et al. | |
| D531,568 | S | * | 11/2006 | Davidian | D12/217 |
| 7,416,166 | B1 | * | 8/2008 | Shaw | 254/88 |
| 2003/0146422 | A1 | * | 8/2003 | Funk et al. | 254/88 |

* cited by examiner

Primary Examiner — Lee D Wilson (57) ABSTRACT

The present invention is a unitary piece block formed of polymers (such as polystyrene or other high strength polymer) by a single injection molding step which are assembled into a recreational vehicle leveler. The invention ramp provides four sets of four connectors at a top of a floor plate, which are adapted to interlock in cavity structures formed within a cavity on the underside of the block. Two adjacent blocks are secured together by applying to their top surfaces the securing cavity structure of an underside of a third such block. Such blocks can be stacked in an interlocking manner to reduce storage space.

5 Claims, 7 Drawing Sheets

HALF BLOCK FOR MULTI-LEVEL INTERLOCKING BLOCKS

This application is a continuation in part of Ser. No. 11/728,925 filed Mar. 27, 2007 now U.S. Pat. No. 7,416,166.

FIELD OF THE INVENTION

The present invention relates to devices used to level recreational vehicles and travel trailers. More specifically, the present invention relates to plastic interlocking blocks used to level recreational vehicles and travel trailers.

BACKGROUND OF THE INVENTION

The prior art describes several forms of interlocking pieces connected so that trucks and recreational vehicles can drive on to them and be leveled at an uneven site.

U.S. Pat. No. D426,933 shows one of a set of at least three interlocking blocks that are set up with two side by side and the third placed on top of halves of the bottom two to lock the three together. It has been found that this form of interlocking block suffers from substantial (over 20%) breakage in actual use with loaded trucks and recreational vehicles. The breakage is due to the particular strains placed on the blocks. A tire must be able to drive up a stepped ramp formed by the blocks and then come to rest preferably at the top of the third or top block or at any place on the stepped ramp. The strain that this makes on plastic pieces has been found to be unique in engineering of plastic parts.

U.S. Pat. No. 5,458,315 attempts to solve this breakage problem by using a heavily reinforced skeleton of brace plates. While in some ways preferable over the device of U.S. Pat. No. D426,933, the polygonal form of the raised part to interlock with a cavity in another block allows substantial lateral twisting that is not allowed with the square raised part shown in U.S. Pat. No. D426,933.

U.S. Pat. No. 7,040,603 shows that, for an interlocking type of ramp piece, from a floor plane level four square upward extensions are formed with four "key recesses" cavities formed therein. The underside of the each piece is formed to receive and interlock with the upward extensions.

There is a need for a device that would combine the non-rotation form of a leveling block with an improved non-breakable form.

SUMMARY OF THE INVENTION

The present invention is a set of at least two interlocking blocks where one of the blocks is a base block comprising four connector sets of four octagonal upward connectors extending from a floor plate, which is elevated from ground level by way of sidewalls and its enclosed sets of supports downward from the floor plate. A half block is similarly constructed as compared to the base block but comprises only two four octagonal upward connectors extending from a floor plate. Base blocks are capable of being set adjacent to each other on a ground surface and interlocked by stacking additional base blocks on top of them to form a leveling device for recreational vehicles.

The addition of one or more half blocks to a kit of base blocks expands the functionality of the entire kit, in that the half blocks cannot be used to interlock adjacent base blocks or other half blocks. However, the unique structure of the half block provides for its use as an additional resistance layer against rolling of a tire of a recreational vehicle without imposing the requirement of leaving a portion of a base block extending from an assembly structure.

The present invention blocks are formed of individual unitary interlocking blocks formed of polymers (such as polyethylene, polypropylene, polystyrene or other high strength polymer) by a single injection molding step. Each block comprises a square or rectangular floor plate whose from periphery extends uniformly downward to a first height an outer sidewall, thereby forming a underside cavity and whereby a lower rim of the outer sidewall defines a ground plane level. For each base block, extending down from an underside of the floor plate to the ground plane in a central portion of the square floor plate are four central support sidewalls forming a central support square and defining a central underside cavity where each vertex of central support square is directed at an inner midpoint of one of the outer sidewalls. The underside cavity is further divided by a paired sets of support flanges which extend from said midpoints to vertices of said central support square, further thereby defining four equal sized and generally square receiving cavities. Each paired set of support flanges extends from an underside of the floor plate to the ground plane level and is bisected by a square cross-section side peripheral support extending down from the floor plate to the ground plane. Two opposite vertices of each side peripheral support define are connected with one of the support flanges.

Further describing the base blocks, sixteen octagonal flat-topped connectors extend up from the floor plate and each define a central pin bore extending from a top opening to a closed end at the floor plate. Said connectors collectively define eight top peripheral square receiving cavities and one top central square receiving cavity. The sixteen connectors are divided into four connector sets, each connector set having four octagonal connectors linked by low projections from the floor plate, each set being generally square and arranged at one of four corner portions of the top of the floor plate. Opposing and center facing sides of the octagonal connectors are parallel, thereby defining in a central part of the connector set a square corner peripheral receiving cavity. A square opening is defined in the floor plate at a bottom of each corner peripheral receiving cavity from which extends down to the ground plane four walls which end in a bottom plate, the combination of the four walls and bottom plate thereby forming square cross-section corner peripheral support.

Opposing and center facing sides of the four central-most connectors of the four connector sets are parallel and define a square central receiving cavity. The opposing sides of the four central-most connectors of the four connector sets are parallel and define a square central receiving cavity.

Opposing and center facing sides of the four connectors of two adjacent connector sets are parallel and define a square side peripheral receiving cavity. Opposing sides of the four connectors of the four connector sets are parallel and define a square central receiving cavity. A square opening is defined in the floor plate at a bottom of each side peripheral receiving cavity from which extends down to the ground plane four walls which end in a bottom plate, the combination of the four walls and bottom plate thereby forming the square cross-section side peripheral support.

Each connector defines a central cylindrical bore extending from a top opening to the floor plate. From the underside of the floor plate of said bore's floor plate extends a cylinder to the ground plane, said cylinder having a diameter less than the diameter of said central cylindrical bore.

The underside cavity beneath the floor plate comprises bridge flanges connecting sides of all the downward extensions from the floor plate. Said bridge flanges extend from the underside of the floor plate to a depth of one half or less of the distance from the underside of the floor plate to the ground plane.

Relative to any edge of a first block, in a horizontal direction across the floor plate and normal to said edge, first, second and third rows of four connectors each are adapted, respectively, to engage and interlock a first, second or third row of cavities underneath a second block. A user is thereby capable to forming a steeper or less steep effective ramp grade when said blocks are connected in an assembly of three or more blocks for use in leveling a recreational vehicle.

In using an assembly of three said blocks, weight of a single wheel portion of a supported vehicle is transmitted onto a top surface of a topmost block, which in turn transmits that force downward in two directions. A first quantity of the downward force is transmitted across the top platform surface to the outer sidewalls of the blocks. A second quantity of the force is transmitted directly downward onto a underlying set of supports. These supports join the sidewalls by way of the underside flanges so that downward force from the top platform surface urges the supports apart, creating a tensioned structure which resists fracture of the floor plate. There is no similar structure to accomplish this effect in prior art leveling ramps.

The force distribution of the present invention ramp is so efficient that the plates of the bridge flanges do not descend all the way from the underside of the floor plate surface to the ground plane. Surprisingly, the overall structure is sufficiently strong to support even the heaviest of recreational vehicles without sagging, cracking or breaking. It is this unique construction that permits the invention ramps to be stacked, using about half the storage volume of a comparable ramp by way of prior art construction.

It is an object of the invention to provide square, relatively low profile, leveler blocks where a first, second or third row of connectors can be engaged, respectively, a first, second or third row of connector cavities which are adapted to interlock by way of square and cylindrical extensions.

DETAILED DESCRIPTION OF THE INVENTION

The invention is now discussed with reference to the figures.

Figure 1:
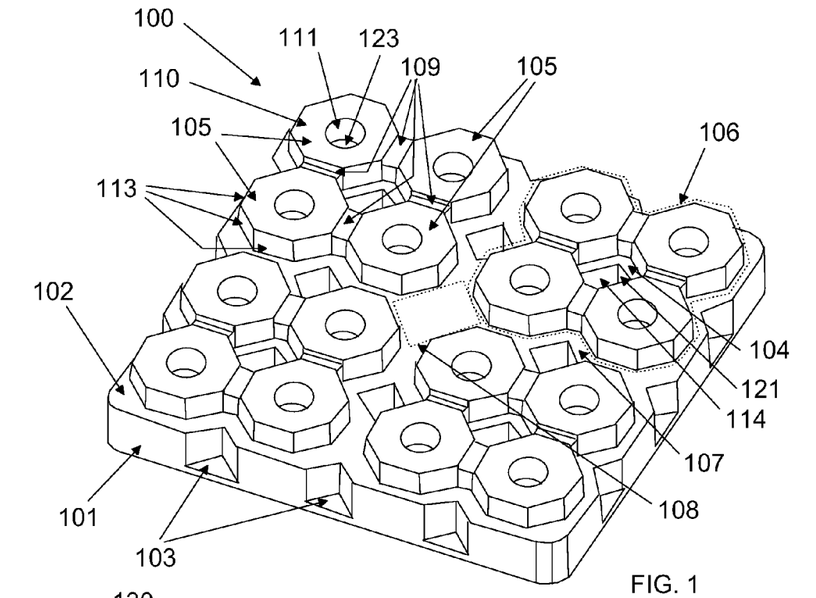
FIG. 1 is a top perspective view of a base block.

FIG. 1 shows a base block 100 having sixteen octagonal flat-topped connectors 105 that extend up from the floor plate 102 and comprise a top surface 110 and vertical sidewalls 113. Each connector 105 a central pin bore having cylinder walls 111 and a closed end 112 at the ground level of bore 123 open at the floor plate. Said connectors 105 collectively define eight top peripheral square receiving cavities 104 and 107 and one top central square receiving cavity 108. The sixteen connectors 105 are divided into four connector sets 106 (shown in broken lines), each connector set 106 having four octagonal connectors linked by low projections 109 from the floor plate 102, each set being generally square and arranged at one of four corner portions of the top of the floor plate 102. Opposing and center facing sides 113 of the octagonal connectors 105 are parallel, thereby defining in a central part of the connector set a square corner peripheral receiving cavity 104. A square opening is defined in the floor plate at a bottom of each corner peripheral receiving cavity from which extends down to the ground plane four walls 121 which end in a bottom plate 120 (not shown), the combination of the four walls and bottom plate thereby forming square cross-section side peripheral support 114.

Opposing and center facing sides 113 of the four centralmost connectors 105 of the four connector sets 106 are parallel and define a square central receiving cavity 108 (shown in broken lines).

Opposing and center facing sides of the four connectors of two adjacent connector sets 106 are parallel and define a square side peripheral receiving cavity 107. A square opening is defined in the floor plate at a bottom of each side peripheral receiving cavity 107 from which extends down to the ground plane four walls which end in a bottom plate (not shown), the combination of the four walls and bottom plate thereby forming square cross-section side peripheral support 114a, which has dimensions identical to those of corner peripheral support 114.

Each connector 105 defines a central cylindrical bore extending from a top opening to the level of the floor plate 102 at closed end 112. From the underside of the closed end 112 and referring now to FIG. 4 extends to the ground plane, a pin cylinder having cylindrical sidewalls 122 and a bore 123 open at an upper end. Cylindrical sidewalls 122 have an outside diameter less than a diameter of said central cylindrical bore of the sidewalls 111 of connectors 105 (as in FIG. 1).

Figure 4:
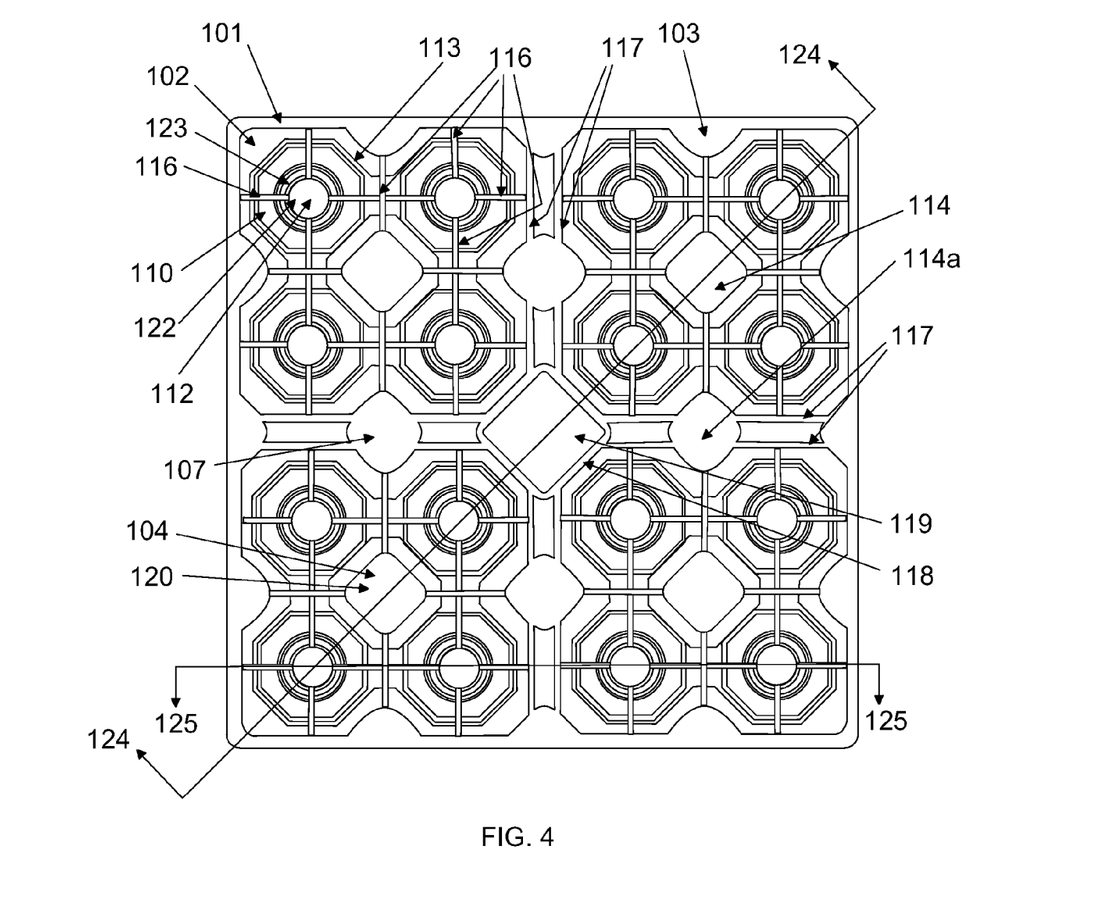
FIG. 4 is a bottom view of the base block.
Figure 5:
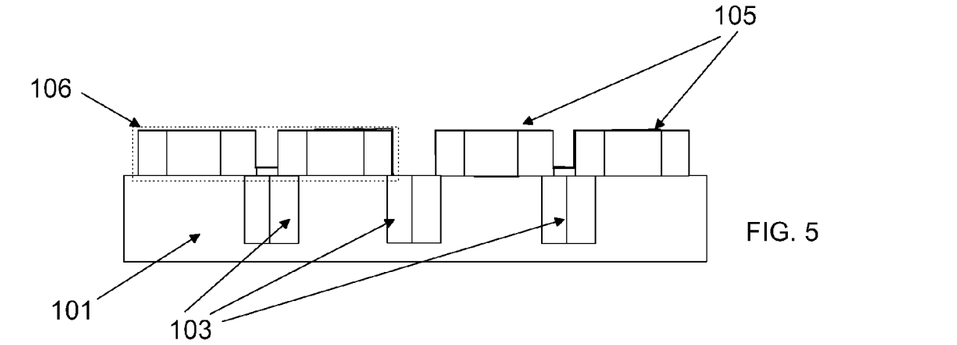
FIG. 5 is a side view of a ramp using only base blocks.
Figure 6:
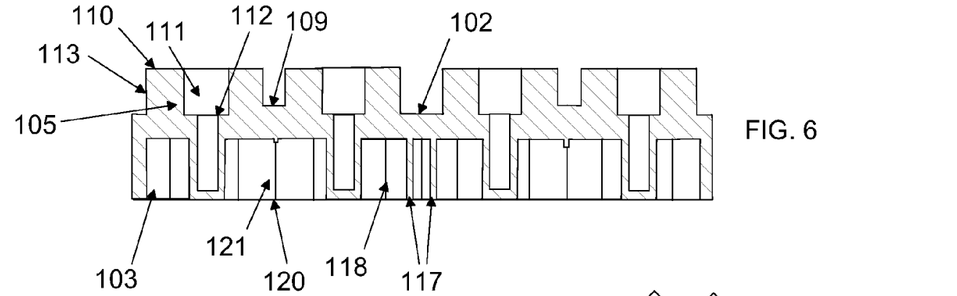
FIG. 6 is a cross section 125 of FIG. 4.
Figure 7:
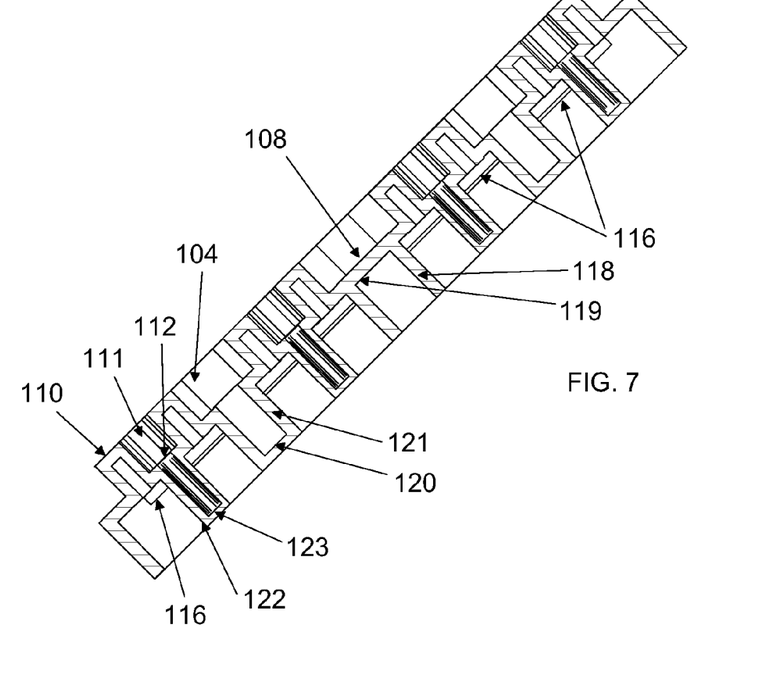
FIG. 7 is a cross section 124 of FIG. 4.

FIG. 4 shows that block 100 comprises a square floor plate 102 whose from periphery extends uniformly downward to a first height an outer sidewall 101 (having optional support notches 103), thereby forming a underside cavity and whereby a lower rim of the outer sidewall defines a ground plane level. Extending down from an underside of the floor plate 102 to the ground plane in a central portion of the square floor plate are four central support sidewalls 118 open at the bottom forming a central support square 119, which define a central underside cavity where each vertex of central support square 119 is directed at an inner midpoint of one of the outer sidewalls 101. The underside cavity is further divided by a paired sets of support flanges 117 which extend from said midpoints to vertices of said central support square 119, further thereby defining four equal sized and generally square receiving cavities for receiving connector sets 106 (shown in FIG. 1).

Referring again to FIG. 4, each paired set of support flanges 117 extends from an underside of the floor plate 102 to the ground plane level and is bisected by a square cross-section side peripheral support 114a extending down from the floor plate 102 to the ground plane and under the portion of the floor plate 102 where side square peripheral cavities 107 (in FIG. 1) are located. Two opposite vertices of each side peripheral support 114a are connected with one of the support flanges 117.

The underside cavity beneath the floor plate 102 comprises bridge flanges 116 connecting sides of all the downward extensions from the floor plate 102. Said bridge flanges 116 extend from the underside of the floor plate 102 to a depth of one half or less of the distance from the underside of the floor plate 102 to the ground plane.

FIGS. 3, 5, 6 and 7 show the above features in other views.

Figure 8:
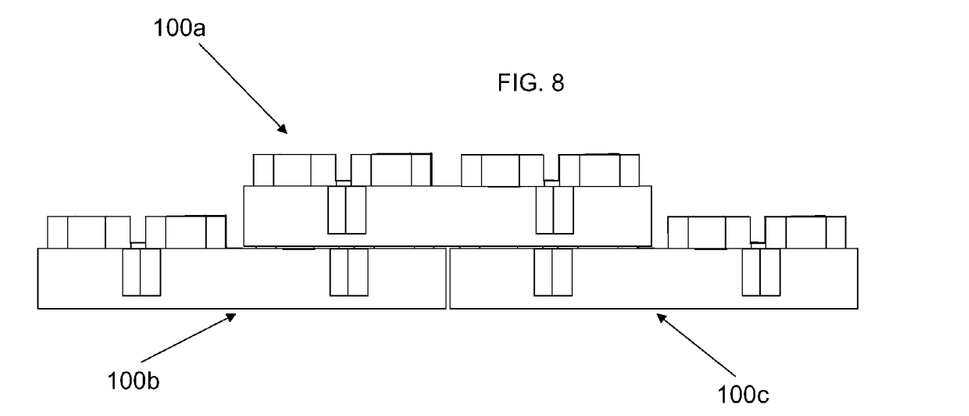
FIG. 8 shows three base blocks as shown in FIG. 5 in a stacked configuration.

FIG. 8 shows blocks 100a, 100b and 100c interlocked with connectors of blocks 100b and 100c secured in the structure of the cavity under the floor plate of block 100a. Blocks 100b and 100c are first arranged abutting one another along adjacent sides of their outer sidewalls. Block 100a is impressed upon the tops of blocks 100b and 100c.

Figure 9:
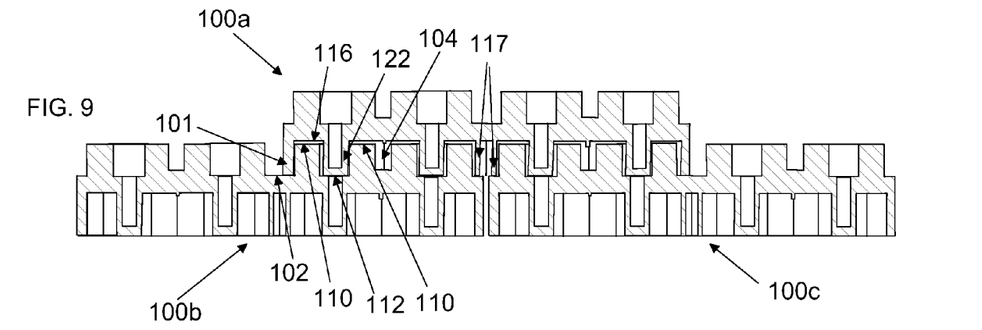
FIG. 9 shows three base blocks as shown in FIG. 6 in a stacked configuration.

FIG. 9 shows a cutaway view of the assembly of FIG. 8, where bridging flanges 116 of block 100a are supported from the top surfaces 110 of the connectors of blocks 100b and 100c. In addition, the cylindrical pins with sidewalls 122 are shown supported from closed end 112 of the cylindrical bore of the connectors of blocks 100b and 100c. A portion of the outer sidewalls 101 of block 100a are supported on a portion of the floor plate of blocks 100b and 100c. A part of the bridge flanges 117 of block 100a are supported from the floor plates of blocks 100b and 100c. For each of one of the adjacent connector sets on the tops of blocks 100b and 100c, a row of two corner peripheral supports 114 and a side peripheral support 114a extending from the underside of block 100a are secured within, respectively, two corner peripheral receiving cavities 104 and one side peripheral receiving cavity 107. Finally, the bottom edges of sidewalls 118 of central support square 119 and support flanges 117 of block 100a are supported from the floor plates 102 of both blocks 100b and 100c.

Therefore, block 100a is connected to block 100b by way of the extensions of eight cylindrical pins, four connectors and three peripheral connectors, which is also true of the connection with block 100c. The central support square, support flanges and bridge flanges are all supported on flat top surfaces of both blocks 100b and 100c. This type of connection is very strong and secure.

Half Block Embodiment

Figure 2:
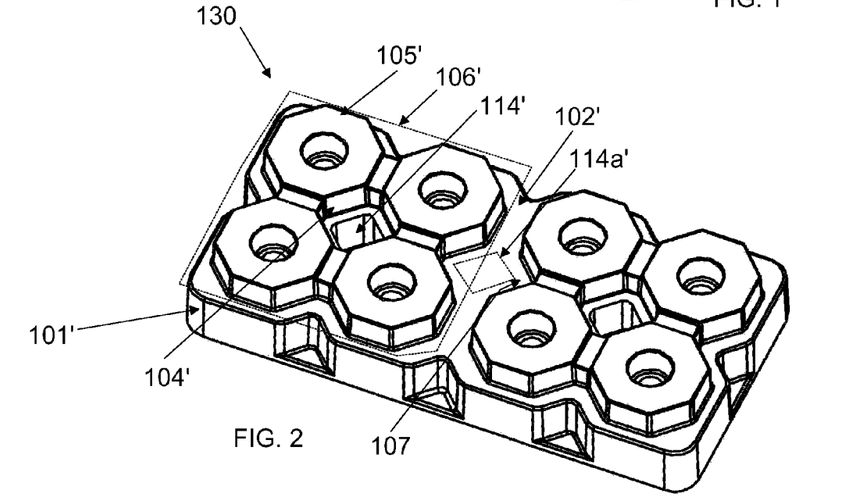
FIG. 2 is a top perspective view of a half block.
Figure 3:
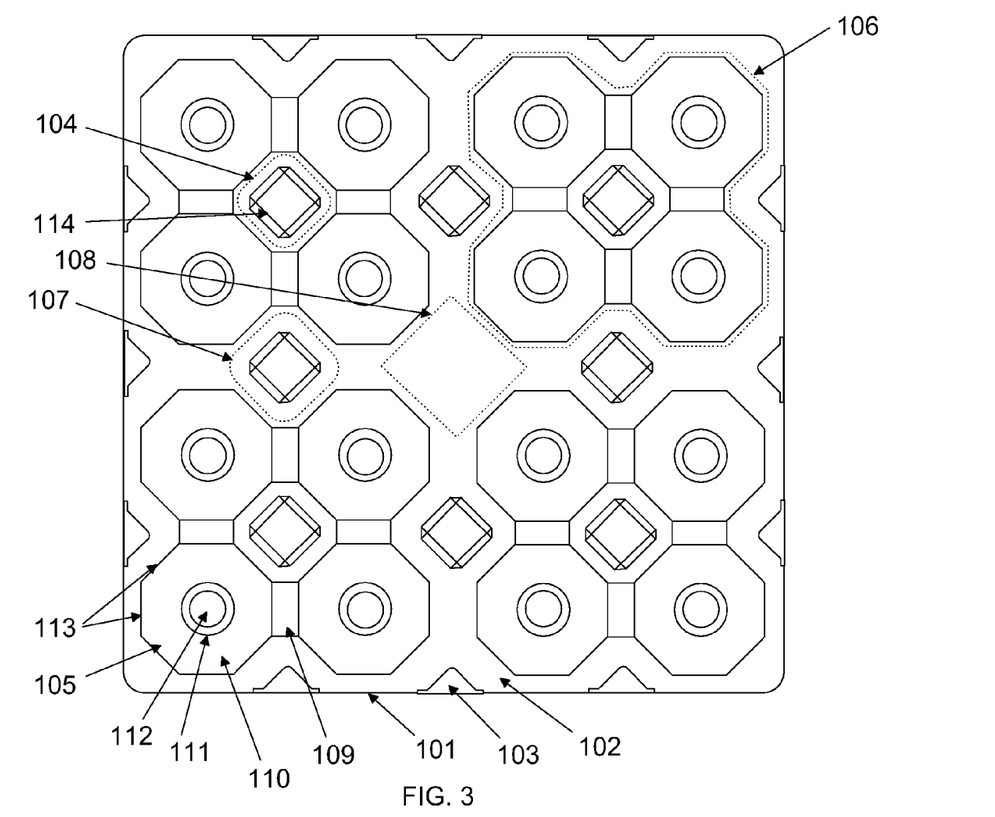
FIG. 3 is a top view of the base block.

FIG. 2 shows a half block 130 similarly constructed as compared to the base blocks described above but comprising only two connector sets 106' comprising four octagonal upward connectors 105'. As used herein, an aspect number in the figures with a prime superscript represents substantially the same aspect as that represented in other figures without the prime superscript, i.e., a connector set 106 of FIG. 1 is substantially the same as the connector set 106' shown in FIG. 2. As such, the half block 130 of FIG. 2 comprises sidewalls 101', a floor plate 102', receiving cavities 104' and 107', support cylinders 121', and square support columns 114' and 114a' (shown in broken lines indicating its extension downward from the top plate 102'). Cross section 131 in FIG. 10 is identical with cross section 125 of FIG. 4.

Figure 10:
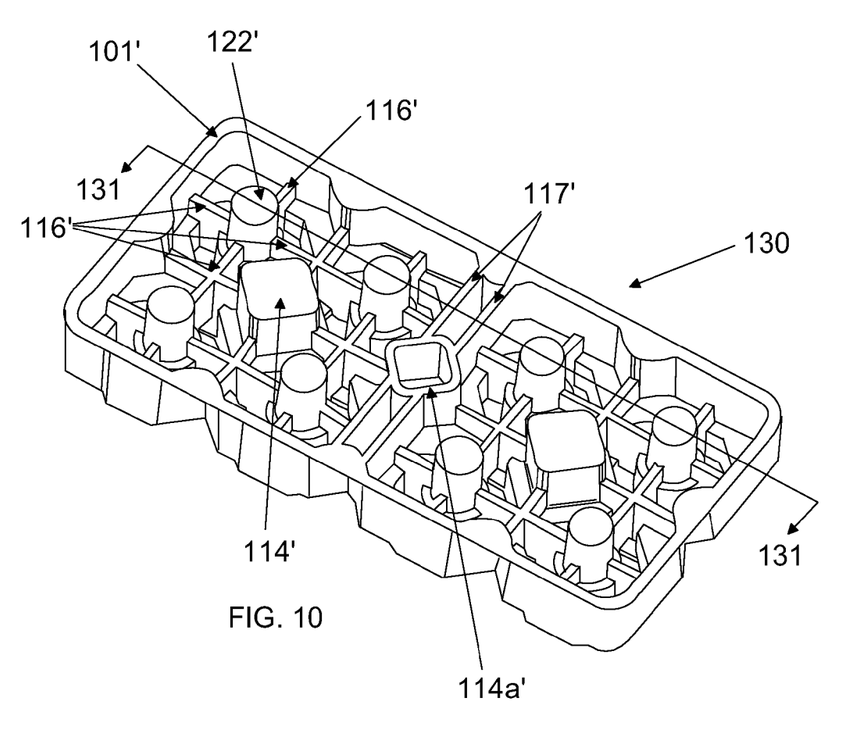
FIG. 10 is a bottom perspective view of the half block of FIG. 2.

FIG. 10 further shows the similarity of half block 130 to the base blocks in comprising flanges 116', support cylinders 122', and support columns 114' and 114a'.

As described and shown in FIGS. 2 and 10, half block 130 is adapted to be engaged above or below a side to side pair of connector sets on a base block. The addition of one or more half blocks to a kit of base blocks expands the functionality of the entire kit, in that the half blocks cannot be used to interlock adjacent base blocks or other half blocks. However, the unique structure of the half block provides for its use as an additional resistance layer against rolling of a tire of a recreational vehicle without imposing the requirement of leaving a portion of a base block extending from an assembly structure.

Figures 11, 12:
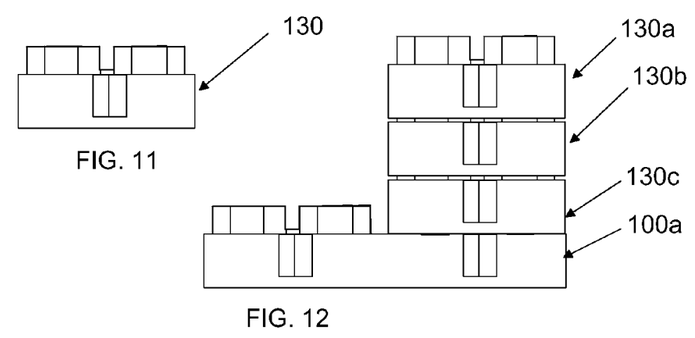
FIG. 11 is cross section 143 of FIG. 10.
FIG. 12 is a side view of a four block kit using a base block and three half blocks.

FIG. 11 shows a side view of a half block 130. In a specific example of a kit of the present invention, FIG. 12 shows half blocks 130a, 130b and 130c stacked and interlocked to each other and supported from base block 100a from half block 130c. A tire of a recreational vehicle rolling rearward upon a top surface of block 100a cannot roll over or cause to collapse the assembly of blocks 130a-c interlocked together as shown in FIG. 12. As such, a kit comprising three half blocks and one base block can be compactly stored but provide a fully resistant fully chock for a wheel of a recreational vehicle.

Figure 13:
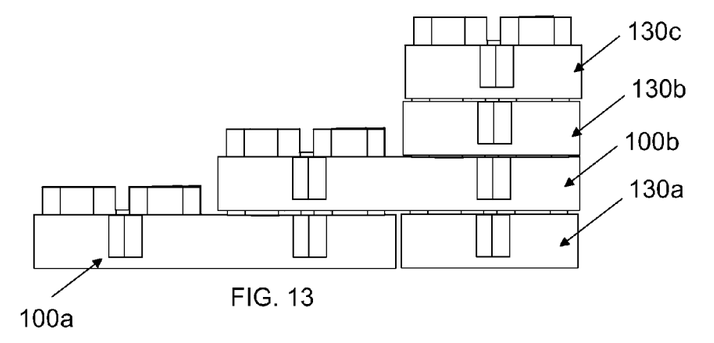
FIG. 13 is a side view of a four or five block kit using two base blocks and two or three half blocks.

FIG. 13 shows a kit comprising base blocks 100a and 100b and half blocks 130a, 130b, 130c, and 103d, where blocks 100a and 130a provide ground level support for the entire kit assembly, block 130a provides ground level support for a half portion of block 100b, and blocks 130b and 130c provide stopping elevation for a recreational vehicle tire.

Figure 14:
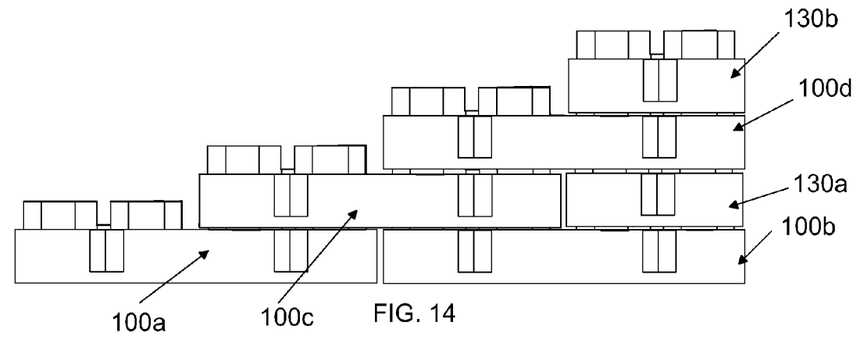
FIG. 14 is a side view of a six block kit using four base blocks and two half blocks.

FIG. 14 shows a kit comprising base blocks 100a, 100b, 100c, and 103d and half blocks 130a and 130b and, where blocks 100a and 100b provide ground level support for the entire kit assembly, block 130a provides underlying support for a half portion of block 100d, and the entire assembly of four levels of blocks provide stopping elevation for a recreational vehicle tire.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A kit consisting of one or more square leveler base blocks and two or more rectangular leveler half block, each formed in a single and unitary molding step of a polymer resin to provide stopping and leveling of a recreational vehicle, comprising:
   (a) each base block comprising:
   (i) a square floor plate whose from periphery extends uniformly downward to a first height outer sidewalls, thereby forming an underside cavity and whereby a lower rim of the outer sidewall defines a ground plane;
   (ii) a central support square extending from the underside of the floor plate to the ground plane and located in a central part of the floor plate so that vertices of said central support square are directed to midpoints of the outer sidewalls and between which are located support flanges bisected by side peripheral supports having square cross sections and which extend from an underside of the floor plate to the ground plane and two of whose vertices are connected with said support flanges;
   (iii) sixteen octagonal flat-topped connectors extending up from a top side of the floor plate, each defining a cylindrical pin bore extending from a top opening to a support surface at the floor plate, where connectors are divided into four connector sets, each connector set having four octagonal connectors adjacently linked by low projections from the floor plate, each set being generally square and arranged at one of four quarter sections of the top of the floor plate;
   (iv) opposing and center facing sides of the octagonal connectors in a connector set are parallel, thereby defining in a central part of the connector set a square corner peripheral receiving cavity;
   (v) opposing and center facing sides of four central-most connectors of the four connector sets are parallel and define a square central receiving cavity;

(vi) opposing and center facing sides of the four connectors of two adjacent connector sets are parallel and define a square side peripheral receiving cavity;
(vii) from the underside of each said pin bore to the ground plane extends a cylinder support, said cylinder support having a diameter less than a diameter of said pin bore;
(viii) from the underside of a part of the floor plate of each corner peripheral receiving cavity to the ground plane extend corner peripheral supports having square cross sections and two of whose vertices are aligned with vertices of adjacent side peripheral supports; and
(ix) bridge flanges extending less than halfway from the underside of the floor plate to the ground plane and supportively connecting extensions from the underside of the floor plate; and (b) each base block comprising:
(i) a square floor plate about one half the area of that of the base blocks and from whose periphery extends uniformly downward to a first height outer sidewalls, thereby forming an underside cavity and whereby a lower rim of the outer sidewall defines a ground plane;
(ii) a central support square extending from the underside of the floor plate to the ground plane and located in a central part of the floor plate so that vertices of said central support square are directed to midpoints of the outer sidewalls and between which are located support flanges bisected by side peripheral supports having square cross sections and which extend from an underside of the floor plate to the ground plane and two of whose vertices are connected with said support flanges;
(iii) eight octagonal flat-topped connectors extending up from a top side of the floor plate, each defining a cylindrical pin bore extending from a top opening to a support surface at the floor plate, where connectors are divided into two connector sets, each connector set having four octagonal connectors adjacently linked by low projections from the floor plate, each set being generally square and arranged at one of two halves of the top of the floor plate;
(iv) opposing and center facing sides of the octagonal connectors in a connector set are parallel, thereby defining in a central part of the connector set a square corner peripheral receiving cavity;
(v) opposing and center facing sides of the four connectors of two adjacent connector sets are parallel and define a square side peripheral receiving cavity;
(vi) from the underside of each said pin bore to the ground plane extends a cylinder support, said cylinder support having a diameter less than a diameter of said pin bore;
(vii) from the underside of a part of the floor plate of each corner peripheral receiving cavity to the ground plane extend corner peripheral supports having square cross sections and two of whose vertices are aligned with vertices of adjacent side peripheral supports; and
(viii) bridge flanges extending less than halfway from the underside of the floor plate to the ground plane and supportively connecting extensions from the underside of the floor plate.

2. The kit of claim 1 wherein the blocks are formed of a polymer from among the group consisting of polyethylene, polypropylene, and polystyrene.

3. The kit of claim 1 wherein the kit consists of one base block and three half blocks.

4. The kit of claim 1 wherein the kit consists of two base blocks and three half blocks.

5. The kit of claim 1 wherein the kit consists of four base blocks and two half blocks.

\* \* \* \* \*